Figure 1:
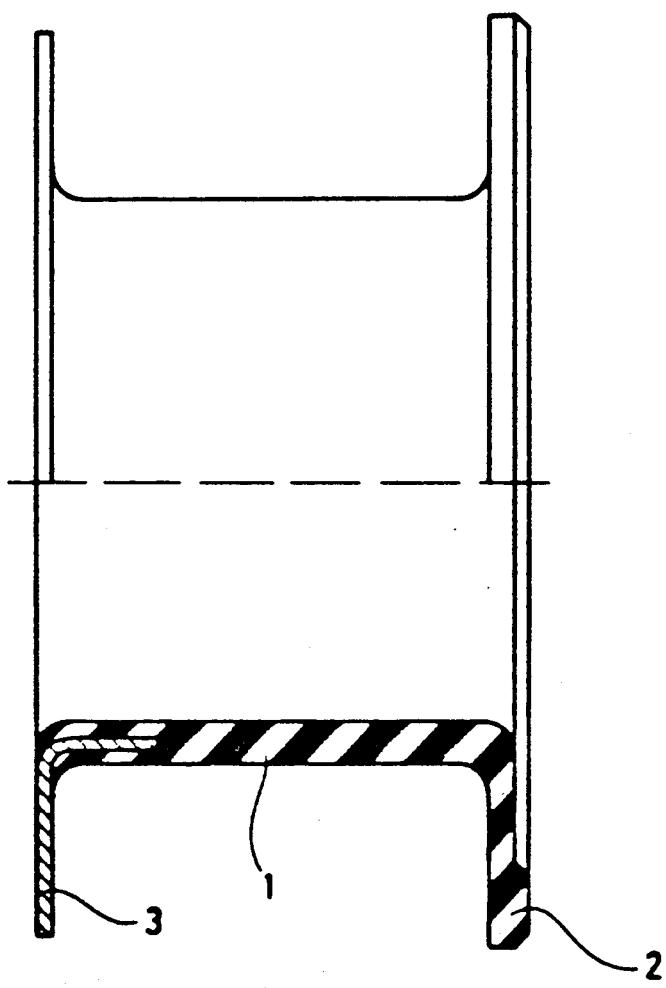

United States Patent [19]

Nilsson et al.

[11] Patent Number: 5,033,543
[45] Date of Patent: Jul. 23, 1991

[54] LINING FOR PLATE HEAT EXCHANGER

[75] Inventors: Bo G. Nilsson, Kävlinge; Nils-Ake Jönsson, Staffanstorp, both of Sweden

[73] Assignee: Alfa-Laval Thermal AB, Lund, Sweden

[21] Appl. No.: 899,297

[22] PCT Filed: Jan. 17, 1986

[86] PCT No.: PCT/SE86/00013
§ 371 Date: Aug. 13, 1986
§ 102(e) Date: Aug. 13, 1986

[87] PCT Pub. No.: WO84/01209
PCT Pub. Date: Mar. 29, 1984

[30] Foreign Application Priority Data

Jan. 25, 1985 [SE] Sweden ................................ 8500352

[51] Int. Cl.⁵ .................................................. F28F 3/00
[52] U.S. Cl. ........................................ 165/166; 285/229
[58] Field of Search ........................... 165/166; 285/229

[56] References Cited

U.S. PATENT DOCUMENTS 3,580,616  5/1971  Merkwacz ............................ 285/229

FOREIGN PATENT DOCUMENTS

| 2055898 | 5/1972 | Fed. Rep. of Germany | 285/229 |
| 2357059 | 5/1975 | Fed. Rep. of Germany | 165/166 |
| WO84/00060 | 1/1984 | PCT Int'l Appl. | 165/166 |
| WO84/01209 | 3/1984 | PCT Int'l Appl. | 165/166 |
| WO84/03555 | 9/1987 | PCT Int'l Appl. | 165/166 |
| 81025108 | 10/1982 | Sweden | 165/166 |
| 813344 | 5/1959 | United Kingdom | 165/166 |
| 1041805 | 9/1966 | United Kingdom | 165/166 |
| 1069184 | 5/1967 | United Kingdom | 285/229 |
| 1079071 | 8/1967 | United Kingdom | 165/166 |
| 2000267 | 1/1979 | United Kingdom | 165/166 |

Primary Examiner—Ira S. Lazarus
Assistant Examiner—Peggy A. Neils
Attorney, Agent, or Firm—Davis Hoxie Faithfull & Hapgood

[57] ABSTRACT

This invention relates to a lining for lining inlet ports and outlet ports in a frame plate or a pressure plate for plate heat exchangers and comprising a cylindrical portion and two flanges which are connected to the cylindrical portion and which during the use of the lining are positioned on each side of the frame plate or pressure plate. According to the invention the lining comprises a rigid part having a cylindrical portion (6; 9; 13B; 16) and a flange (3; 8; 13A; 19) being an integral part of the cylindrical portion, and that the remaining part of the lining is made of an elastic material.

7 Claims, 6 Drawing Sheets

LINING FOR PLATE HEAT EXCHANGER

This invention relates to a lining for lining inlet ports and outlet ports in a frame plate or a pressure plate for plate heat exchangers and comprising a cylindrical portion and two flanges which are connected to the cylindrical portion and which during the use of the lining are positioned on each side of the frame plate or the pressure plate.

A plate heat exchanger comprises a number of heat exchange plates which are fastened between a frame plate and a pressure plate. In the frame plate and in certain cases also in the pressure plate are made inlet ports and outlet ports for the heat exchanging media. In these inlet ports and outlet ports are usually linings inserted, whereby the frame and the pressure plates do not come into contact with the heat exchange medium which can be corrosive. This means that the frame plates and the pressure plates can be made of a cheap material.

By the international publication Nos. WO 84/00060 and WO 84/01209 are linings previously known which are made of metallic and non-metallic material, respectively. Both these linings have their special advantages like in first hand strength and stability regarding the metal lining and elasticity and simple application regarding the non-metallic lining. The linings, however, are also impaired by certain drawbacks like a relatively high cost regarding the metal lining and in certain cases unsufficient strength and stability regarding the non-metallic lining.

This invention aims to join the advantages of the metallic lining and the non-metallic lining. This is made possible by a lining of the kind mentioned by way of introduction, which is characterized in that the lining comprises a rigid part having a cylindrical portion and a flange being integral with this portion, and that the remaining part of the lining is made of an elastic material.

By this design of the lining a product is created which is cheap to manufacture, easy to apply and has sufficient stability and strength.

Figure 2A:
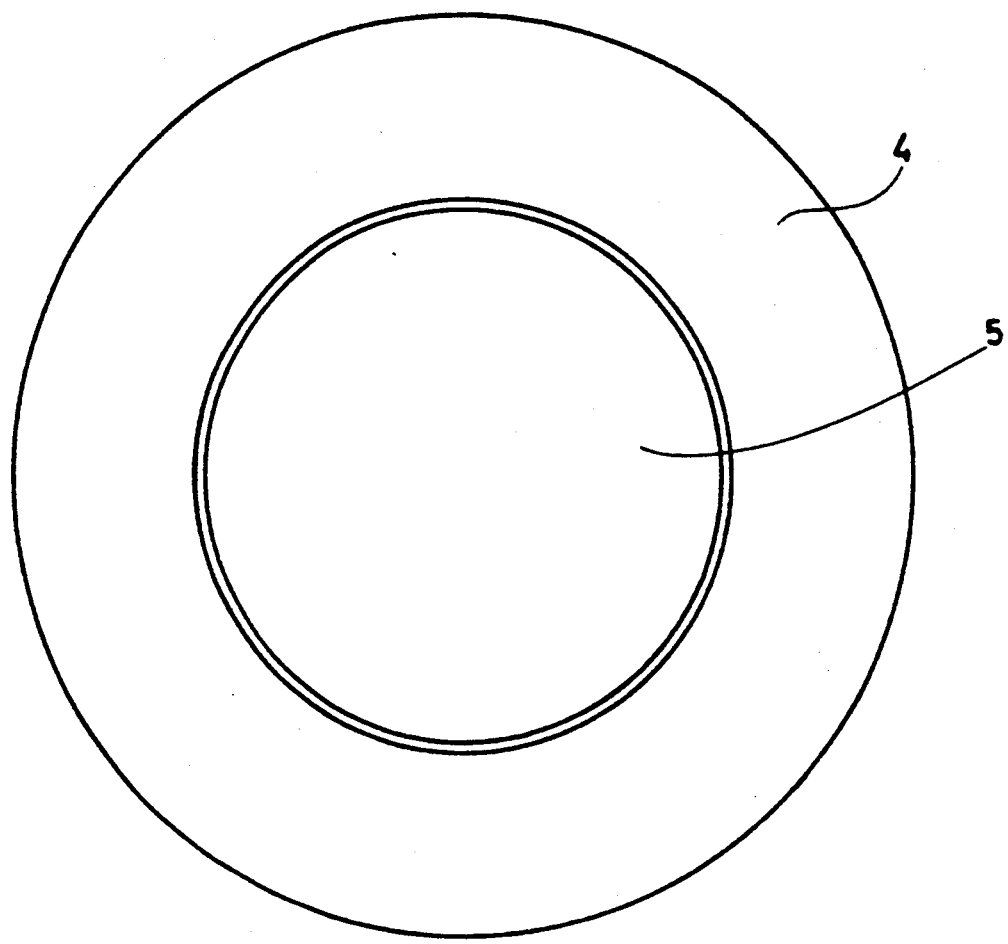
Figure 2B:
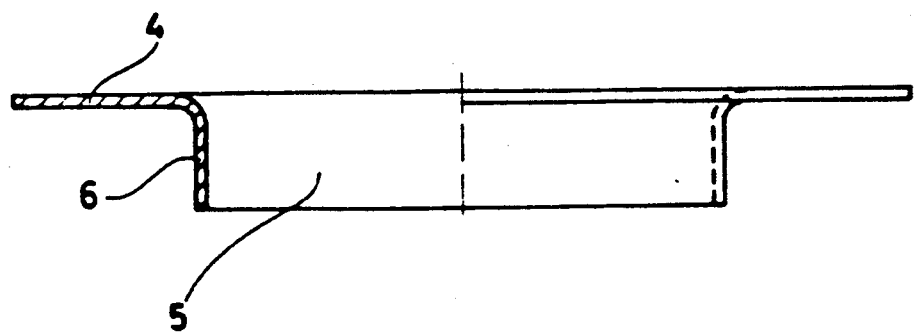
Figure 3A:
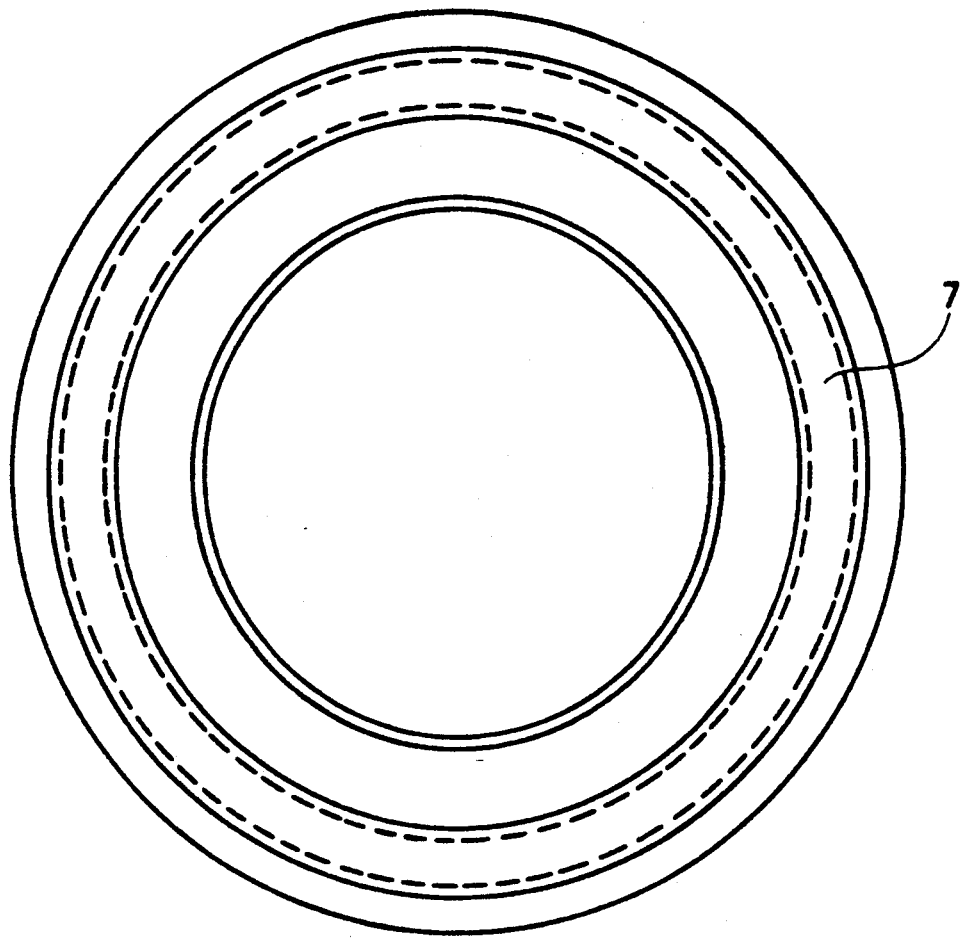
Figure 3B:
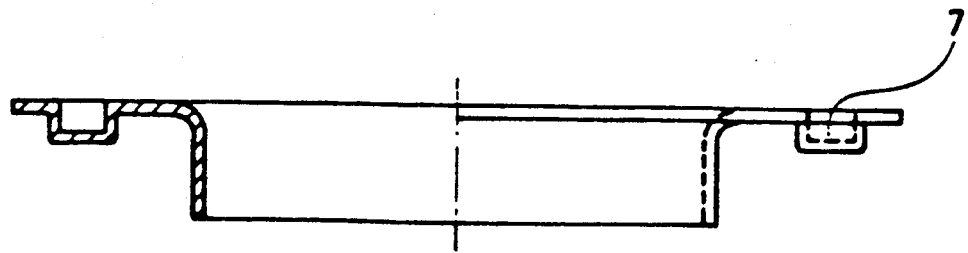
Figure 4:
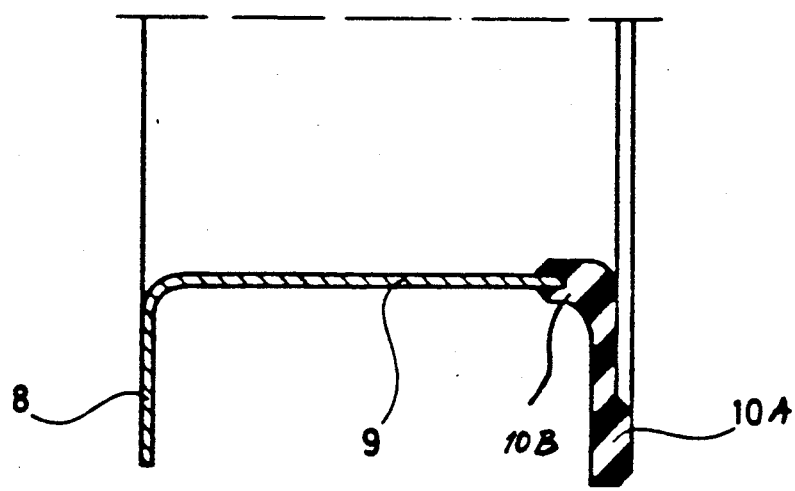
Figure 5:
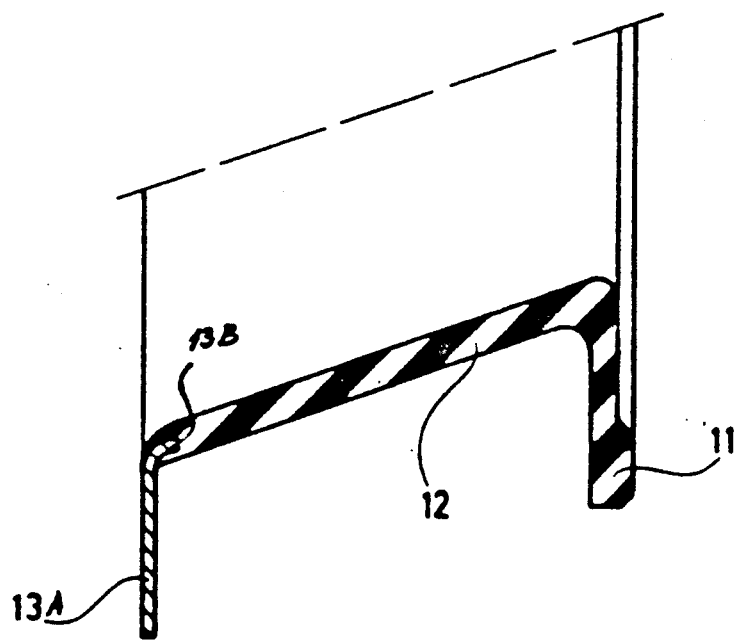
Figure 6:
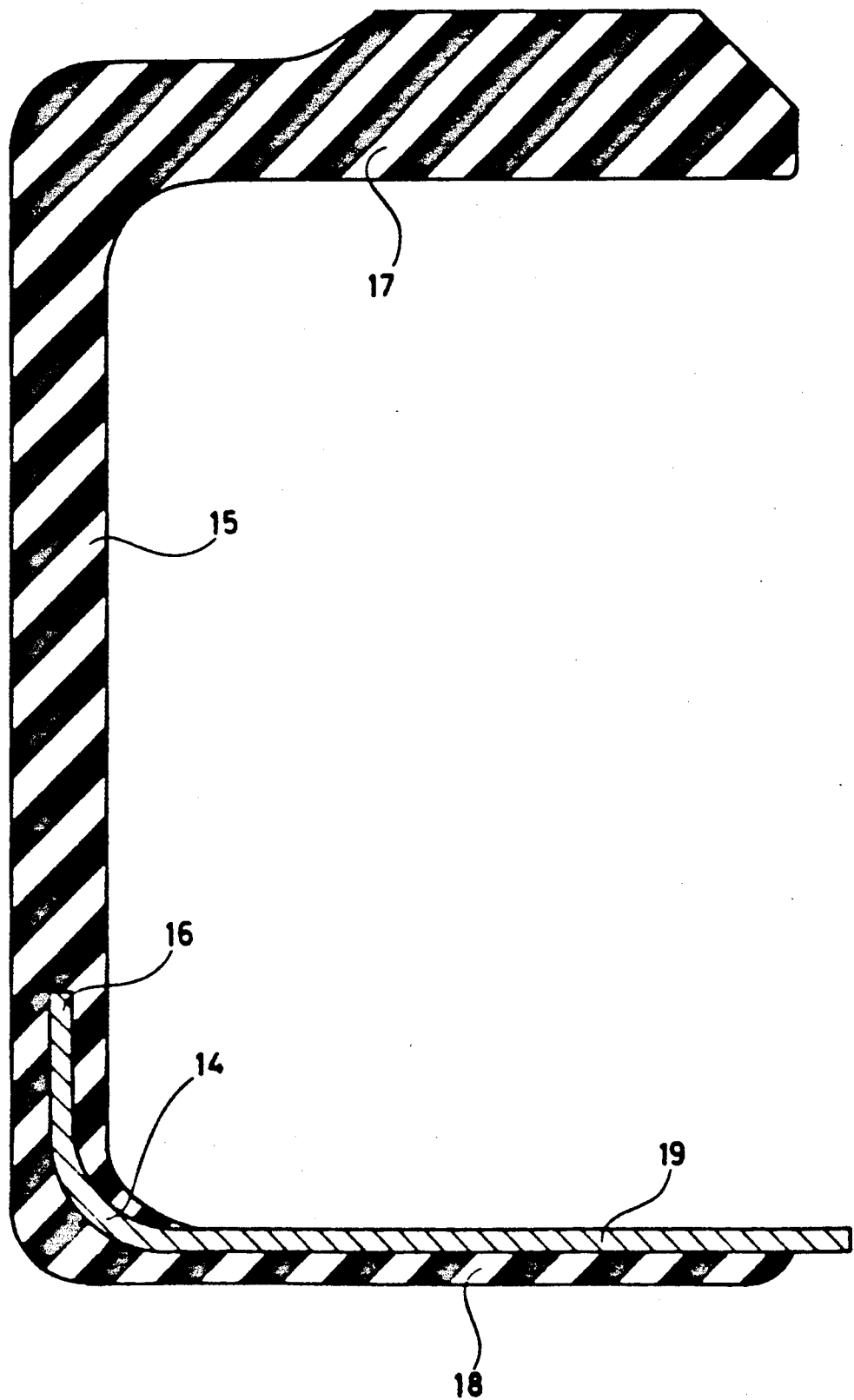

Some preferred embodiments of the invention shall be described in more detail with reference to the accompanying drawings, in which FIG. 1 shows a first embodiment of the lining comprising an elastic portion and a metallic plate, half the figure showing a cross-section through the lining, FIG. 2a is a plan view of the metal plate shown FIG. 1, FIG. 2b is a cross-section through the metal plate according to FIG. 2a, FIG. 3a is a planview of a modified metal plate, FIG. 3b is a cross-section through the metal plate according to FIG. 3a, FIG. 4 is a cross-section through a divided lining according to a second embodiment, FIG. 5 is a cross-section through a divided lining according to a third embodiment, and FIG. 6 is a cross-section through a divided lining according to a fourth embodiment.

Figure 7:
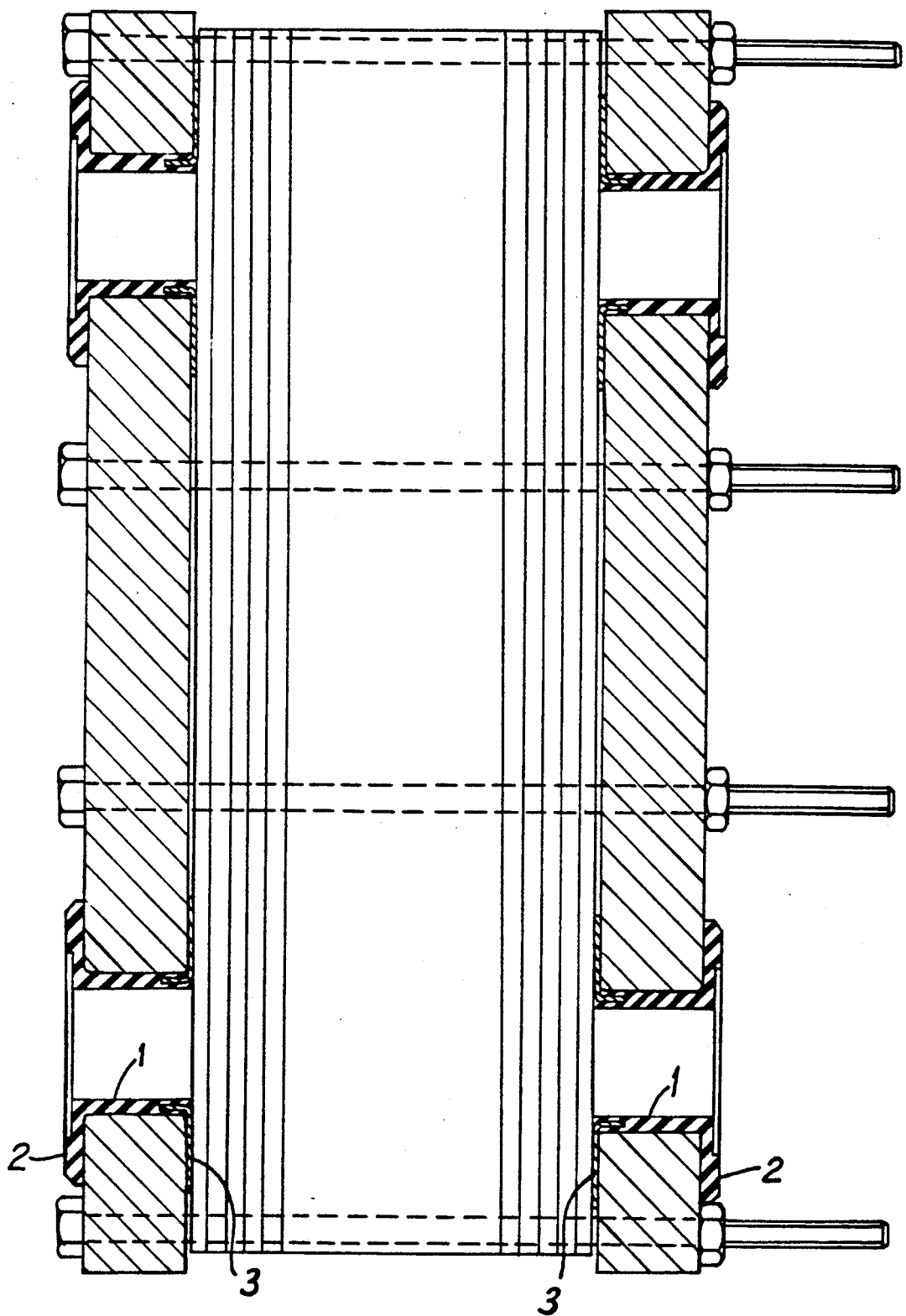

FIG. 7 is a view of the embodiment of FIG. 1 showing the combination of a plate heat exchanger and the lining.

Referring to FIG. 1 is there shown a first embodiment of the lining. The lining comprises a cylindrical portion 1 of an elastic material, preferably rubber and two flanges 2 and 3. One 2 of the flanges is made in one piece with the cylinder 1 and accordingly consists of rubber. This flange 2 is intended to rest against a connecting tube flange. The second flange 3 is intended to rest against a heat exchange plate and is made of a rigid material, preferably a thin stainless steel plate. Other metallic material can be titanium or Hastalloy. The flange 3 is fastened to the cylindrical rubber portion 1 preferably by means of vulcanization. The flange 3 shown more closely in FIG. 2 comprises a round plate 4 provided with a hole 5 for the medium that is to be heat exchanged. Furthermore a little, cylindrical portion 6 is an integral part of the flange 3 and is embedded into the rubber cylinder. The flange 3 is so thin that it can be put between the frame plate or the pressure plate and an adjacent heat exchange plate without machining of the frame plate or the pressure plate at the area for the inlet ports and outlet ports. In this connection the heat exchange plates are so oriented that the gasket grooves with the gaskets of these ones are directed to the frame plate or the pressure plate which is provided with the mentioned linings at the inlet ports and the outlet ports for the media that are to be heat exchanged. By the presence of the metal flange the gasket of the heat exchange plate can be used as a seal against the flange.

In FIG. 3 is shown a modified metal plate differing from that according to FIG. 2 by the fact that it is provided with a pressed gasket groove 7 into which a suitable gasket is intended to be inserted. This gasket is intended to co-operate with the closest heat exchange plate in the package and therefore in this case this plate does not need to be provided with a gasket.

In FIG. 4 and FIG. 5 are shown further embodiments of the lining. In this connection FIG. 4 shows a lining where the metal plate comprises a flange 8 and essentially the whole cylindrical portion 9 while the second flange 10A of the lining is made of an elastic material. This flange 10A and a little cylindrical portion 10B are integral parts and therefore this portion 10B is also made of the elastic material. This portion 10B is fastened to the cylindrical portion 9 of the metal plate in a suitable way. In this connection it ought to be mentioned that it is within the scope of the invention to arrange a metallic cylindrical portion of an arbitrary size. That means that if for instance one of the flanges and half the cylindrical portion is made of rigid metallic material the remaining half of the cylinder and the second flange are made of an elastic material.

In FIG. 5 is shown an embodiment intended to be used in frame plates or pressure plates provided with bevelled holes. Thus the centre line of the lining does not run perpendicularly but obliquely in relation to the plane of the plate. According to the figure one 11 of the flanges of the lining and the cylindrical portion 12 are made of rubber while the second flange 13A of the lining is made of metal plate. The flange 13A of the lining and a little cylindrical portion 13B are integral parts and therefore this portion 13B too is made of a metallic material. The metal part and the rubber part according to FIGS. 4 and 5 are fastened to each other by means of vulcanization.

As has been previously mentioned the metal plate is preferably made of a thin stainless steel plate. In certain cases there could be a desire to make the metal plate of a cheaper material. The problem in this case can then be that the medium that comes into contact with the metallic material can affect this one such that corrosion arises. The solution of this problem is such a lining shown in FIG. 6.

This lining like the other linings comprises a rigid metallic part 14 and an elastic part 15. In this connection the metallic part has a little cylindrical portion 16 being embedded into the elastic part 15 and a flange 19 being an integral part of the cylindrical portion 16. In order to prevent the metal plate from coming into contact with the heat exchange medium during the use of the lining the metal plate is covered by the elastic part of the lining. The elastic part of the lining in this case comprises a cyclindrical portion and in one of its ends a flange 17 for co-operation with a connecting tube flange. In its other end the cylindrical part is provided with a flange-like projection 18 being outside the flange 19 of the metal plate and at least partly covers the same. The projection 18 is suitably fastened to the flange 19 by means of vulcanization.

The first heat exchange plate co-operates with the lining and is therefore provided with a gasket groove with a gasket applied thereto which gasket rests and seals against the projection 18 of the lining.

The rigid part 14 normally comprises a metal plate. This metal plate can be perforated whereby the flange like projection 18 is held to the flange 19 without vulcanization. Instead of a metal plate the rigid part can be a metal net or a fabric of suitable material.

By the invention herewith described the result is a lining having on one hand the elasticity of the non-metallic lining and being simple to mount in that way which is characteristic for the non-metallic lining, and having on the other hand the strength and stability of the rigid lining.

Other advantages are that (1) crush problems regarding the flange between the heat exchange plate and the frame plate are avoided, (2) different end plates are avoided and (3) the same lining can be used independently of the design of the gasket groove in the heat exchange plate.

According to the application rubber has been suggested as elastic material and steel plate as rigid material. The invention however is not limited to these two materials but other materials like different types of plastics can be found. Thus as a rigid material for instance teflon can be used and as an elastic material for instance a non-rigid plastic.

What is claimed:

1. In combination with a plate heat exchanger having a frame plate and a pressure plate forming end plates with opposite side surfaces, a number of heat exchange plates disposed between said end plates forming passages for at least two heat exchange fluids and inlet ports and outlet ports in at least one of said end plates communicating with respective passages in the heat exchange plates, a lining in each port comprising a cylindrical portion (1, 9, 15), a thin annular first flange (3, 8, 19) extending radially from one end of the cylindrical portion, and a second flange (2, 10A, 17) extending radially from the other end of the cylindrical portion, said cylindrical portion covering the wall of said port, said first flange being interposed between the respective end plate and a heat exchange plate disposed adjacent one of said side surfaces of the end plate and said second flange engaging the opposite one of said side surfaces, wherein said first flange (3, 8, 19) of each lining is rigid and comprises a rigid material resting directly against an unmachined part of the end plate, and said second flange (2, 10A, 17) comprises an elastic material, said first and second flanges being sealingly connected to said cylindrical portion (1, 9, 15).

2. The combination of claim 1, wherein at least a part of the cylindrical portion (1, 9, 15) comprises an elastic material integrally connected to the second flange (2, 10A, 17).

3. The combination of claim 2, wherein the rigid material of the first flange (19) is covered at least partly on its surface directed towards the heat exchange plate by an elastic flange-like projection (18) forming an extended part of said elastic material.

4. The combination of claim 1, wherein at least a part of the cylindrical portion (1, 9, 15) comprises a rigid material integrally connected to the rigid material of the first flange (3, 8, 19).

5. The combination of claim 4, wherein the rigid material comprises a thin metal sheet material 6. The combination of claim 1, wherein the elastic material comprises rubber.

7. The combination of claim 1, wherein the rigid material is connected to the elastic material by means of vulcanization.

* * * * *